F. PEREZ de la TEGA.
Evaporating-Pan.
No. 222,942. Patented Dec. 23, 1879.
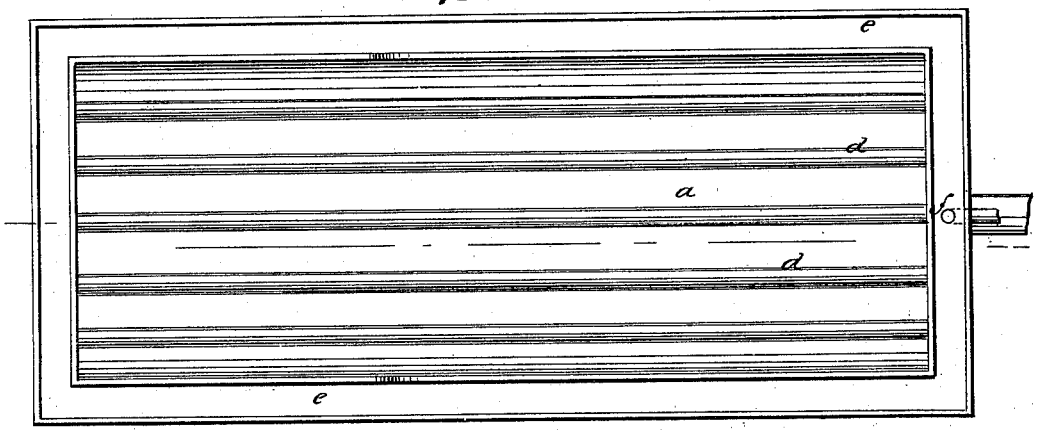
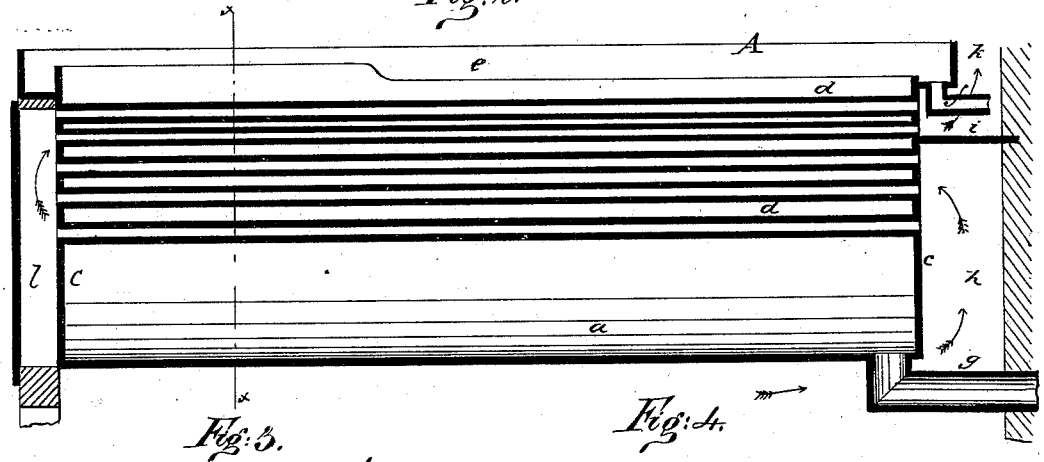
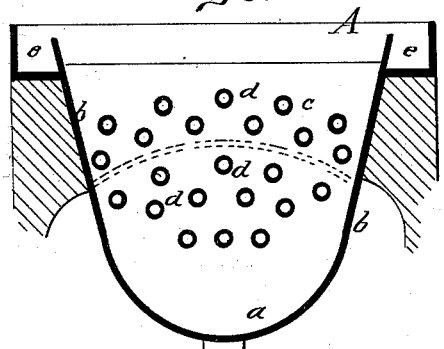
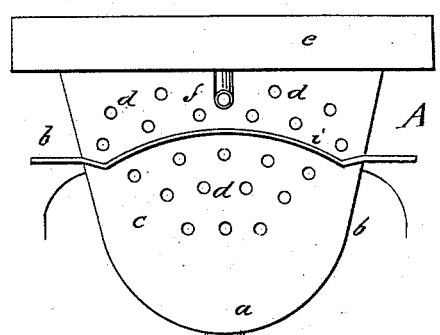

UNITED STATES PATENT OFFICE.

FELIPE PEREZ DE LA TEGA, OF HAVANA, CUBA.

IMPROVEMENT IN EVAPORATING-PANS.

Specification forming part of Letters Patent No. 222,942, dated December 23, 1879; application filed August 4, 1879.

*To all whom it may concern:*

Be it known that I, FELIPE PEREZ DE LA TEGA, of Havana, Cuba, have invented a new and Improved Evaporating-Pan, of which the following is a specification.

My improvements relate especially to pans or boilers for the evaporation of sugar-sirup, and have for their object to prevent incrustation of the pan and a rapid evaporation.

The invention consists in an open-topped evaporating-pan having tubular flues and separating-plate, in combination with furnace-walls to form chambers, as hereinafter described.

Figure 1 is a top view of a pan constructed in accordance with my invention. Fig. 2 is a vertical longitudinal section of the same, showing also the connection of the furnace-flues. Fig. 3 is a vertical cross-section on line $x\ x$ of Fig. 2. Fig. 4 is an elevation of the back end of the pan.

Similar letters of reference indicate corresponding parts.

A is the improved pan. This is formed with the curved or semicircular bottom $a$, inclined sides $b$, and ends $c$, the sides and ends being fitted at their upper edges with a ledge or flange, by which the pan is supported on the furnace.

The tubular flues $d$ extend through the central space of the pan lengthwise thereof, and open through the ends $c$, to which the flues are attached in any desired manner.

The supporting-ledge of the pan is turned upward at its outer edge, and at the inner edge there is also a flange, so that a trough, $e$, is formed around the pan. The inner side or flange of the trough may be formed by a continuation of the sides $b$, and at the front of the pan, for about one-third of the length, where the ebullition is greatest, this edge is made higher, to retain the scum that boils over into the trough.

At the back of the pan is a pipe, $f$, for conveying away the liquid thrown out with the scum. $g$ is a pipe for emptying the pan.

The pan is to be fitted in connection with a furnace of suitable character, whereby the products of combustion first pass beneath the pan to the rear, then forward through the lower tubes $d$, and back again through the upper flues $d$ to the escape-flue.

As shown in Fig. 2, the heated air and gases pass beneath pan A to the chamber $h$ at the rear end of the pan, which chamber is divided by a horizontal plate, $i$, separating the lower tubes $d$ from the escape-flue $k$.

The front wall of the furnace is formed with a space, $l$, into which the tubes $d$ open, and by this construction the circulation described is obtained.

The pan is set into the furnace so that its bottom and a considerable portion of its sides are exposed to the direct heat of the fire-chamber. This is more readily accomplished by the round-bottom pan, and a large extent of heating-surface thereby obtained.

In operation, the sirup is highly heated and a rapid circulation is set up, which prevents incrustation and throws off the foreign matters into the scum-trough. The flues $d$ utilize the heat to a greater extent than is possible with a direct flue when burning light fuel, such as bagasse.

The pan is adapted for use for evaporating purposes generally where a rapid operation is desired.

I have already filed a separate application for a patent on the furnace with which this evaporating pan or boiler is to be used.

A boiler or evaporator with trough near the top and a rounded bottom, a multitubular arrangement, and a division of flues into two sets are hereby severally disclaimed; but

What I claim as new is—

An evaporating pan or boiler, $a\ b\ c$, having a surrounding trough, $e$, at the top, two sets of flues, $d\ d$, and the horizontal plate $i$, whereby end spaces, $h\ l$, serving as flues, will be left when the pan is set in the furnace, as shown and described.

FELIPE PEREZ DE LA TEGA.

Witnesses:
JOS. A. RAPHEL,
JOS. SPRINGER.